UNITED STATES PATENT OFFICE.

RALPH C. BROWNE AND FRANK BALCH, OF SALEM, MASSACHUSETTS, ASSIGNORS, BY MESNE ASSIGNMENTS, TO SAID BROWNE.

PROCESS OF PREPARING STORAGE-BATTERY PLATES.

SPECIFICATION forming part of Letters Patent No. 716,663, dated December 23, 1902.

Application filed April 21, 1902. Serial No. 104,048. (No specimens.)

*To all whom it may concern:*

Be it known that we, RALPH C. BROWNE and FRANK BALCH, of Salem, in the county of Essex and Commonwealth of Massachusetts, have invented certain new and useful Improvements in Processes of Preparing Storage-Battery Plates, of which the following is a specification.

Our invention aims in general to improve the efficiency of storage batteries by providing a new character of lead, or it may be other metallic elements capable of increased capacity for accumulation of electricity, requiring less time for charging and giving vastly-improved results in percentage of discharge.

This invention relates particularly to the preparation of the plates for electrolytic forming; and its aim and object is to bring about by chemical reactions in a comparatively short time such a condition of the raw plates as conducive to abundant peroxidation by electrolysis. The mechanical application to the plates of active material or material to become active, originated by Faure or Brush, is wholly dispensed with and attendant disadvantages avoided, nor is the slow process of formation originated by Planté required. At the same time we are enabled to retain all the advantages of both types of storage batteries.

It is well known that the homogeneity of plates formed by the Planté process is of itself a source of advantage over the Faure-formed plates in point of stability under electrolytic action in the battery; but not only is the Planté process too long to be practical, it, furthermore, has the disadvantage of involving a treatment of the raw plates which tends to dissolve the metal and restrict thereby the depth to which the plates can be peroxidized or reduced to a spongy state, so that electrical capacity per unit of weight in the battery is comparatively small. This difficulty is perhaps adequately overcome, at least theoretically, by the mechanical application of active material or material to become active; but the character of the material and the mode of its union with the plates are such as to invite separation therefrom under the changes which take place when electrolytic action is set up.

What may be considered a third process of preparing storage-battery plates involves an electrochemical treatment prior to that which finally forms the plates, such treatment consisting in decomposition by an electric current of a solution containing salts of the metal of the plates. This may be classed as a modification or refinement of the original Planté process, and while it certainly has some advantages over the same yet it has been found altogether too expensive to be practical and, furthermore, cannot be relied upon for uniformity in action.

Our process differs from all these in that we take the raw plates and by a purely chemical treatment of them obtain the desired preliminary formation, retaining the advantages of homogeneity of structure without limitation of the relative depth to which the sponge formation can be carried. In fact, instead of the plates losing weight, as in Planté's forming process, they actually gain in weight, and the electrical capacity per unit of weight in the battery will in consequence be large.

In carrying out our invention we prepare a solution containing a solvent and a non-solvent of the metal of the raw plates, and by observing certain predetermined temperatures and proportions we are enabled to secure upon the plates a heavy deposit of salts of the metal scale-like in formation and porous, tough, and adherent.

As lead is the metal most used for storage-battery plates, and probably best suited for the purpose, we will describe one of our modes of procedure specifically with reference to this metal, as follows: To thirty ounces of sulfuric acid at a temperature of 204° Fahrenheit, preferably contained in an open vessel or beaker, we add seventeen ounces of potassium nitrate and allow the temperature of the mixture to lower to 185° Fahrenheit. We then add sixteen ounces of water and stir in an ounce and a half of ammonium sulfate, and when red fumes are given off we add seventy-four ounces more of water and allow the solution to cool to 79° Fahrenheit, at which temperature it is maintained while the plates are being treated. In our experience plates of lead immersed in the above-described solution and allowed to remain but three hours while the temperature is maintained at 79° Fahrenheit become heavily incrusted with scale in many superposed layers, clinging together, and of a porous nature with a distinct grain. The lead is found to have increased in weight, and there is no precipitation of powder, detracting from the bulk or weight of the lead. When the incrustation or coating of the lead has been perfected in the solution, the plates are ready for "forming" by electrolysis, in the course of which peroxid of lead is produced on the plates connected with the positive pole and spongy lead on the plates connected with the negative pole of the dynamo or other source of current-supply.

It may here be stated that the treatment of lead by our process results in a new product, for the lead takes on characteristics of structure and composition not possessed by any prepared storage-battery elements known to us. We are enabled by our process to heavily coat metallic lead by chemical treatment with tough, porous, and adherent scale to any depth, admirably adapting the lead to battery uses, for the thick scale so abundantly formed supplies an ideal medium for peroxidation and for reduction to a spongy state—the conditions essential for accumulation and discharge of electricity in combination with an ordinary electrolyte, such as dilute sulfuric acid. The scale produced is of flake-like character and marked by a decided grain, as distinguished from the precipitation of powder, and the process of our invention is known to produce on a comparatively thin lead strip a great many layers of such scale, one superposed upon another, so that the lead is multiplied in bulk and increased in weight. As near as we have been able to ascertain the scale is a lead sulfate produced and deposited by the reaction of chemical agents herein specified; but we are led to believe from certain characteristics of the scale that there is combined with the sulfate a metallic salt, which hardens the same and renders it more adherent.

We are aware that it has heretofore been proposed to immerse lead plates in a bath of dilute sulfuric acid and nitric acid prior to forming the plates; but this has been practiced merely for cleansing purposes or for the purpose of securing greater uniformity of subsequent electrochemical action in the formation of cast plates in which there is a lack of uniformity of molecular structure. The proportions employed and the temperatures observed, as also the order of procedure, have so far differed from those essential in the practice of our invention as to preclude the production of the heavy-grained scale of sulfate secured by us, so that no result comparable with that we attain is possible in the pursuit of these prior methods. We do not, however, desire to confine ourselves to the exact proportions or temperatures herein specified, as these can be varied to some extent without departing from the spirit and scope of the invention. We have contented ourselves with giving the formula which in our experiments has been found to give the most satisfactory results; but we have successfully used other proportions of chemicals and other temperatures than specified.

Having thus described our invention, what we claim as new is as follows:

1. The process of preparing storage-battery plates for electrolytic forming, the same consisting in heating a prescribed quantity of an acid which is a solvent of the metal of the plate, to a predetermined temperature, adding thereto at such temperature a prescribed quantity of an acid which is a non-solvent of said metal, mixing in at a lowered temperature a quantity of water, and steeping the raw plates in the solution at a still lower temperature.

2. The process of preparing storage-battery plates for electrolytic forming, the same consisting in heating a prescribed quantity of an acid which is a solvent of the metal of the plate to a predetermined temperature, adding thereto at such temperature a prescribed quantity of an acid which is a non-solvent of said metal, mixing in at a lowered temperature a quantity of water and a binding agent, and steeping the raw plates in the solution at a still lower temperature.

3. The process of preparing storage-battery plates for electrolytic forming, the same consisting in heating a prescribed quantity of sulfuric acid, adding thereto potassium nitrate, mixing in at a lowered temperature a quantity of water, and steeping the raw plates in the solution at a still lower temperature.

4. The process of preparing storage-battery plates for electrolytic forming, the same consisting in heating a prescribed quantity of sulfuric acid, adding thereto potassium nitrate, mixing in at a lowered temperature a quantity of water and a small amount of ammonium sulfate, and steeping the raw plates in the solution at a still lower temperature.

In testimony whereof we have signed our names to this specification, in the presence of two subscribing witnesses, this 16th day of April, A. D. 1902.

RALPH C. BROWNE.
FRANK BALCH.

Witnesses:
JOHN MURRAY MARSHALL,
FRANK PARKER DAVIS.